United States Patent [19]

Jeong et al.

[11] Patent Number: 5,731,889

[45] Date of Patent: Mar. 24, 1998

[54] WAVELENGTH DIVISION DEMULTIPLEXING DEVICE, AND SYSTEM USING IT

[75] Inventors: Jong-Sool Jeong, Seoul; Chong-Hoon Kwak; El-Hang Lee, both of Daejeon, all of Rep. of Korea

[73] Assignee: Electronics and Telecommunications Research Institute, Daejeon-shi, Rep. of Korea

[21] Appl. No.: 352,564

[22] Filed: Dec. 9, 1994

[51] Int. Cl.⁶ .................................................. G01B 9/02
[52] U.S. Cl. .......................... 359/258; 359/584; 359/578
[58] Field of Search .............................. 359/578, 579, 359/258, 302, 303, 257, 247, 584; 356/352

[56] References Cited

U.S. PATENT DOCUMENTS

| 3,851,973 | 12/1974 | Macek | 350/164 |
| 4,525,028 | 6/1985 | Dorschner | 350/377 |
| 5,111,326 | 5/1992 | Ball | 359/258 |

OTHER PUBLICATIONS

Applied Physics Letters, vol. 30, No. 10, 15 May 1977. pp. 519–521.
Applied Optics Letters, vol. 21, No. 12, 15 Jun. 1982. pp. 2195–2198.
Applied Physics Letters, 40(2), 15 Jan. 1982. pp. 120–122.
Applied Optics Letters, vol. 15, No. 7, 1 Apr. 1990. pp. 363–365.
Optical Engineering Letters, vol. 29, No. 3, Mar. 1990. pp. 200–209.

*Primary Examiner*—Timothy P. Callahan
*Assistant Examiner*—Dinh T. Le
*Attorney, Agent, or Firm*—Antonelli, Terry, Stout & Kraus, LLP

[57] ABSTRACT

A wavelength division demultiplexing device, and a system using the device are disclosed, in which there is utilized a Pabry-Perot etalon using as a spacer layer a Kerr medium in which the refractive index is varied in accordance with the intensity of beams. The wavelength division demultiplexing device according to the present invention includes: a substrate; a first mirror layer formed on the substrate, and consisting of an alternately repeating medium used as a bottom mirror layer; a second mirror layer consisting of an alternating repeating stack of a high refractive index medium and a low refractive index medium used as a top mirror layer; and a spacer layer composed of a Kerr medium and disposed between the first mirror layer and the second mirror layer; wherein the reflectivity of the first mirror layer is higher than that of the second mirror layer; and the thickness of the spacer layer is set such that the value of the initial tuning phase of the spacer layer for the range of wavelengths of an incident beam is $m\pi + t\pi$, where m represents an integer, and t represents 0.2–0.4.

15 Claims, 3 Drawing Sheets ns.

1
WAVELENGTH DIVISION DEMULTIPLEXING DEVICE, AND SYSTEM USING IT

BACKGROUND OF THE INVENTION

1. Field of the invention

The present Invention relates to a wavelength division demultiplexing device, and a system using the device, in which there is utilized a Pabry-Perot etalon as a spacer layer functioning as a Kerr medium in which the refractive index is varied in accordance with the intensity of beams.

2. Description of the Prior Art

Generally, a wavelength division demultiplexing device is an optical device which is used in an optical information processing system or optical exchange system such as the optical telecommunication system and the like, in which the integrated optics or optical fibers are used. A wavelength division demultiplexing device carries out the function of spatially splitting the signal beams composed of beams of various wavelengths in accordance with the wavelength.

Currently, in the widely used wavelength division demultiplexing devices, there is a filter utilizing a wave guide prism or an interference, and a grating utilizing the diffraction phenomenon.

Of such devices, the wavelength division demultiplexing device utilizing the wave guide prism can be easily manufactured, but it has the problem that the band width in which the wavelength distribution is possible is very narrow.

In an attempt to overcome the above described disadvantages of the wavelength division demultiplexing device, there has been proposed a wavelength division demultiplexing device in which a diffraction grating is formed by utilizing an interference pattern of E-beams or holograms which have a single mode or a multi-mode in a wavelength distribution method.

This diffraction grating has the following three types.

In the first type, gratings having different periods are arranged in a proper order. The second type has a structure of chirped grating in which the period is varied in accordance with the space. The third type has a structure of a multiplexing diffraction grating.

In the wavelength division demultiplexing device of the first type, when the wavelength is distributed through the arrangement of the gratings, a high efficiency is achieved, and the manufacturing of the devices for the different wavelengths is easy. This is an advantage. However, it has to be manufactured in such a manner that the arrangement of the gratings has to be done correspondingly with the number of the channels, and therefore, the overall size of the device is increased by several multiples of 10 mm. This is a disadvantage.

Those above described disadvantage is overcome with the wavelength division demultiplexing devices of the second and third types. However, the manufacturing of them are difficult, and the efficiency of the wavelength distribution is not high. Therefore, there are problems associated with their mass production and their practical use.

Meanwhile, if the wavelength division demultiplexing device is to be applied to an optical system, the following conditions are imperative.

The necessary conditions are: a high resolution, a large number of channels, a small channel cross talk, a low insertion loss, a low loss coupling for a multi-mode fiber, a simple and stable structure, a feasibility for economic mass production, and the minimizing of size.

2
SUMMARY OF THE INVENTION

An object of the present invention is to provide a wavelength division demultiplexing device which overcomes the above described disadvantages of the conventional techniques, and which satisfies the above described conditions.

Another object of the present invention is to provide a wavelength division demultiplexing device and a system using it, in which a high polarized light rotating efficiency is embodied, the energy loss is low, the peak line width of the reflected beams relative to the various wavelength multiplexed signal beams is narrow, and divisions in accordance with polarization control beams are made possible.

In achieving the above objects, the wavelength division demultiplexing device according to the present invention includes: a substrate; a first mirror layer formed on the substrate, and consisting of an alternate repeated stack of a low refractive index medium and a high refractive index medium used as a bottom mirror layer; a second mirror layer consisting of an alternate repeated stack of a high refractive index medium and a low refractive index medium used as a top mirror layer; and a spacer layer composed of a Kerr medium and disposed between the first mirror layer and the second mirror layer; wherein the reflectivity of the first mirror layer is higher than that of the second mirror layer; and the thickness of the spacer layer is set such that the value of the initial tuning phase of the spacer layer is $m\pi+t\pi$, where m represents an integer, and t represents 0.2–0.4.

In the above construction, the reflectivity of the first mirror layer, which is used as a bottom mirror layer, is set to 100%, and the reflectivity of the second mirror layer, which is used as a top mirror layer, is set to 95% to 99%.

Furthermore, the optical thickness of the high refraction index media which lie in the mirror layers should be preferably set to ¼ of the wavelength of the signal beams.

The material which is used for the top and bottom mirror layers includes PbTe/ZnS, ZnS/MgF2, ZnS/Na3AlF6 or the like.

The Kerr medium which is used for the spacer layer is composed of a tertiary non-linear material, and the tertiary non-linear material includes $Y3Fe5O_{12}$, GdTbFe, TbFeCo, AgInSbTe, $EuFeO_3$, $GdFeO_3$, FeF3, $FeBO_3$, Co, MnBi, $MgFe_2O_4$, GaAs, InAs, and As2S3.

The substrate is determined in accordance with the kind of the Kerr medium of the spacer layer, and the material is composed of one selected from a group consisting of glass, quartz, $SiO_2$, fused silica, and polymers.

In another aspect of the present invention, the system using the wavelength division demultiplexing device according to the present invention includes: a beam generating means for generating signal beams and polarization control beams having an angular difference of 45 degrees between the signal beams and the polarization control beams; a beam splitting means for receiving the signal beams and the polarization control beams to reflect the signal beams after the passed-through signal beams are polarized-rotated and reflected; a wavelength division demultiplexing device for rotating by 90 degrees an X component of polarized beams of the incident signal beams by utilizing the interference of the Kerr effect generated from the incident signal beams (after passing through splitting means) by the polarization control beams, and for reflecting the X component beams to supply them to the beam splitting means; and a polarizing analyzer for receiving the beams reflected from the beam splitting means to allow pass-through of only the reflected beams having a particular wavelength in accordance with the intensity of the polarization control beams.

In the case where the wavelength division demultiplexing device according to the present invention is applied to the optical system, the wavelength division demultiplexing device carries out the polarized beam rotation by utilizing the interference of the pure beams, and therefore, energy loss is extremely low, while the polarized beam rotation efficiency reaches almost 100%.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
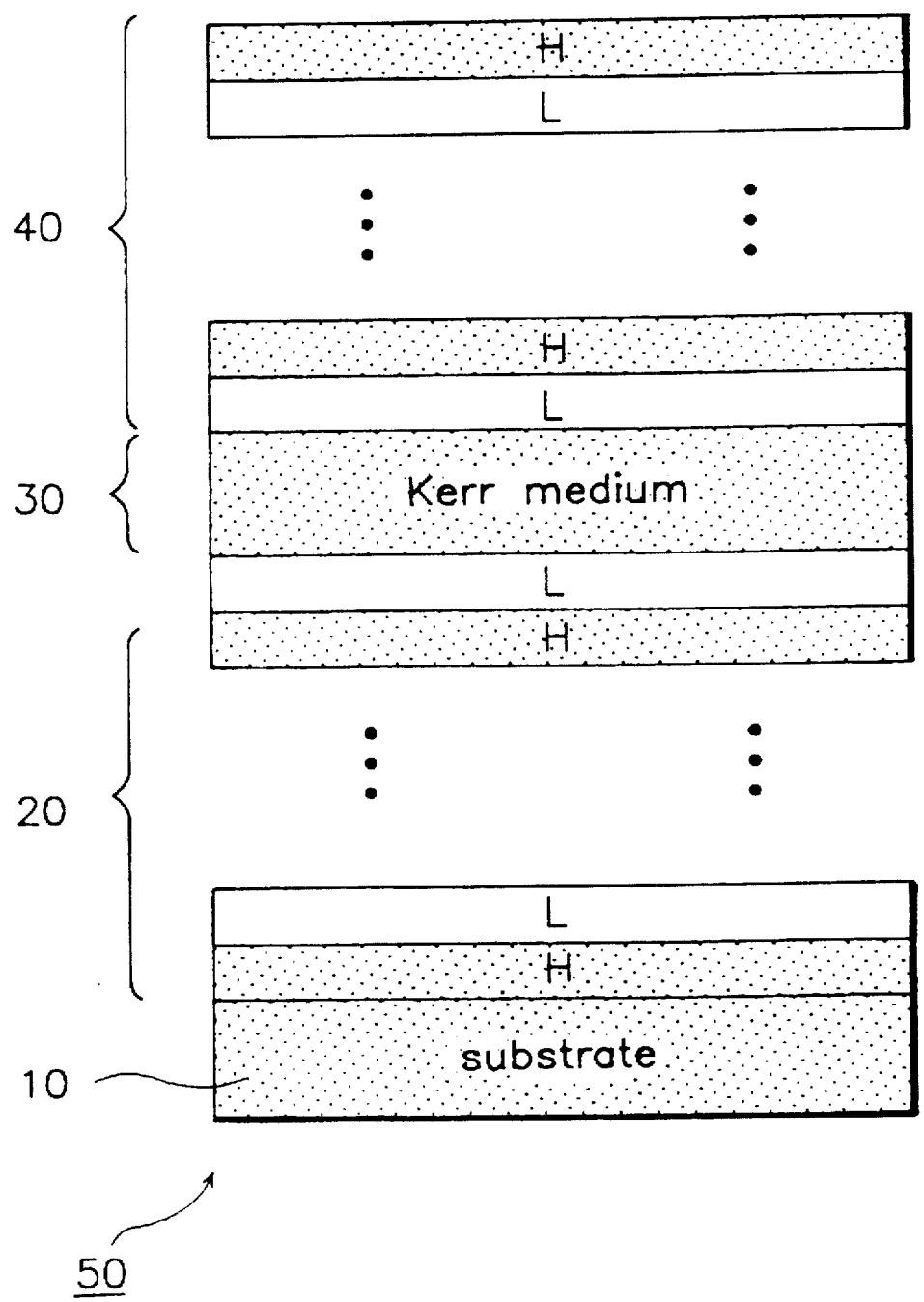
FIG. 1 is a sectional view showing the construction of the wavelength division demultiplexing device according to the present invention.

FIG. 1 is a sectional view showing the construction of the wavelength division demultiplexing device according to the present invention. Reference numeral indicates a substrate, and reference numerals 20, 30 and 40 indicate respectively a bottom mirror layer, a spacer layer and a top mirror layer stacked in the cited order on the substrate 10.

The spacer layer 30 is filled with a Kerr medium in which a crystalline polarizing face is rotated in accordance with the Kerr effect. The Kerr medium is a tertiary non-linear material selected from a group consisting of Y3Fe$_5$O$_{12}$, GdTbFe, TbFeCo, AgInSbTe, EuFeO$_3$, GdFeO$_3$, FeF3, FeBO$_3$, Co, MnBi, MgFe$_2$O$_4$, GaAs, InAs and As2S3.

The material for the spacer layer should be preferably selected in such a manner that, if a large change is caused in the refractive index, then the double refraction characteristics induced by the Kerr effect should be large. The Kerr effect refers to the phenomenon that, when an electric field or a magnetic field is imposed in accordance with the characteristics of the medium, the crystalline polarization face of the medium is rotated. Such a rotating medium is called Kerr medium.

The material of the substrate 10 is determined in accordance with the kind of the Kerr medium of the spacer layer 30. That is, it is selected from the group consisting of glass, quartz, SiO$_2$, fused silica, and polymers.

Like the top mirror layer 40, the bottom mirror layer 20 is formed on the substrate 10, and has a stacked structure in which low refractive index media and high refractive index media are alternately stacked.

The stacked materials for the top and bottom mirror layers are such that the high refractive index material (H) is ZnS, and the low refractive index material (L) is one of MgF2, Na3AlF6 and the like, and the material used in the preferred embodiment of the present invention being one of PbTe/ZnS, ZnS/MgF2, ZnS/Na3AlF6.

Thus, the above mentioned mirror layers are formed in such a manner that the materials H and L are alternately deposited. The top mirror layer 40 is made to have a reflectivity of 90 to 99%, while the bottom mirror layer 20 is made to have a reflectivity of 100%.

In the above described mirror layers, the reflectivity becomes higher, as the thickness of the stack of the high refractive index material H and the low refractive index material is increased. Therefore, if the reflectivity is to be lowered (that is, if the transmittance is to be increased), the stack thickness of the materials has only to be reduced.

Particularly, if the maximum reflectivity is to be secured for the signal beams incident to the bottom, mirror layer 20, that is, if a reflectivity of 100% is to be obtained, the optical thickness of the bottom mirror layer 20 has to be ¼ of the wavelength of the signal beams, as can be obtained from Formula 1 below.

$$d1 \times n = \lambda/4 \quad (1)$$

In the above formula, d1 indicates the thickness of the high refractive index material, n indicates the refractive index of the material, and λ indicates the wavelength of the signal beams.

In the preferred embodiment of the mirror layers of the present invention as described above, a structure of an alternately stacked a high refractive index material H and a low refractive index material L is shown. However, the present invention is not limited to this stacked structure, but the top mirror layer 40 may be composed of only a low refractive index material so as to have a low reflectivity. Further, an L-H-L structure may be possible.

In the above described embodiment, assuming that one H-L structure is one layer, if the bottom mirror layer is made to be composed of 40 layers, then the maximum reflectivity is obtained.

Meanwhile, the signal beams include various wavelengths owing to the wavelength multiplexing, and therefore, the mirror layers should be manufactured in such a manner that they should satisfy the condition of a quarter-wave length relative to the average wave length.

As described above, a spacer layer is formed between the top mirror layer and the bottom mirror layer. Further, as shown in FIG. 1, it will be assumed that top and bottom mirror layers 40A and 20 respectively have a single stack structure of H-L, and that a spacer layer 30 is formed between the top and bottom mirror layers 40 and 20. Based on this example, the relationship of the transmittance to the incident beams will be described.

Referring to FIG. 1, if signal beams having various wavelengths enter with a certain inclination angle, then a part of the beams are reflected away, while a part of them passes through the top mirror layer and the spacer layer in the cited order. Ultimately, the beams are all reflected away by the bottom mirror layer.

Under this condition, the amount of the beams reflected by the respective mirror layers are determined by the reflectivities of the top and bottom mirror layers and by the refractive index and the thickness of the spacer layer.

If the wavelength division demultiplexing device of FIG. 1 is to have a high polarization rotation efficiency and a good line width, there should be taken into account the reflectivities of the top and bottom mirror layers, the initial tuning phase of the spacer layer, and the variation of the non-linear refractive index of the Kerr medium which forms the spacer layer.

In the preferred embodiment, the operating characteristics of the wavelength division demultiplexing device are varied in accordance with the initial tuning phase, while the variation of the non-linear refractive index depends on the Kerr medium. Therefore, it is desirable that a medium is selected in which the refractive index variation is large, and the double refractive characteristics induced by the Kerr effect is also large.

Then referring to FIG. 2, the polarization switching system which is formed by utilizing the wavelength division demultiplexing device according to the present invention will be described. Particularly, the principle of rotation of signal beams incident to the wavelength division demultiplexing device will be described.

Figure 2:
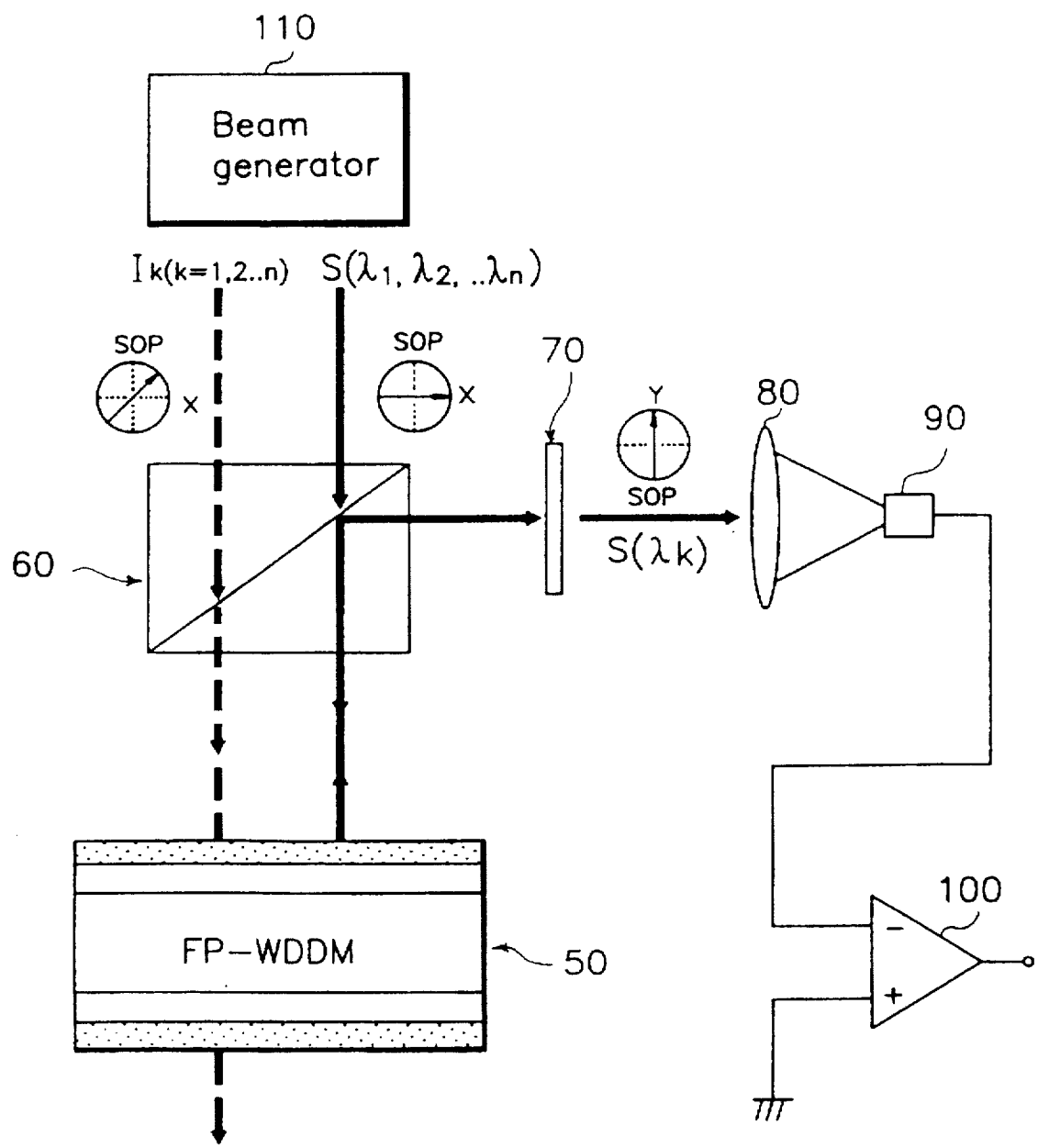
FIG. 2 illustrates the construction of the system using the wavelength division demultiplexing device of FIG. 1.

In FIG. 2, reference numeral 50 indicates the wavelength division demultiplexing device according to the present invention, reference numerals 60 and 70 respectively indicate a beam splitter and a polarizing analyzer, reference numeral 80 indicates a beam focusing lens, reference numerals 90 and 100 indicate respectively a photo diode and an operational amplifier, and reference numerals 110 indicates a beam generator. The beam generator 110 generates polarization control beams and signal beams having a polarization difference between the two sets of the beams. Further, reference letters SOP indicate the polarization states of the respective beams.

The beam generator 110 includes a beam multiplexer for multiplexing beams of different wavelengths, so that signal beams $\lambda1, \lambda2, \lambda3 \ldots \lambda n$ composed of different wavelength beams are outputted. Further it generates polarization control beams $I_k$ (k=1, 2, 3, ...) having a polarization angle difference of 45 degrees relative to the signal beams.

When the signal beams S are supplied from the beam generator 110 to the beam splitter 60, the signal beams S which have passed through the beam splitter 60 enter into the wavelength division demultiplexing device 50.

Under this condition, the polarization control beams $I_k$ (pump beams) which are furnished by the beam generator 110 pass through the beam splitter 60 with a polarization angle difference of 45 degrees relative to the signal beams S. Then the polarization control beams enter into the wavelength division demultiplexing device 50, so that the polarization control beams I interfere with the signal beams S which have entered into the wavelength division demultiplexing device 50.

That is, the polarization control beams I changes the material state of the wavelength division demultiplexing device 50, particularly the state of the Kerr medium, so that the polarization of the incident signal beams would be rotated.

Due to such an interference, the polarized beams of the signal beams S which have been reflected by the wavelength division demultiplexing device 50 are rotated away. These rotated beams are reflected by the beam splitter 60 to be supplied to the polarizing analyzer 70.

The polarized beams of particular wavelength which have passed through the polarizing analyzer 70 (i.e., the beams which are selected in accordance with the intensity of the polarization control beams) are focused on a focal point by the focusing lens 80. The focused beams are converted into electrical signals by the photo diode 90, and the converted electrical signals are amplified by the operational amplifier 100.

The polarized beams of the signal beams S which have been rotated and reflected by the wavelength division demultiplexing device 50 is split into 90-degree rotated polarized beams Ry and non-rotated beams Rx by the polarizing analyzer 70.

Thus, when the polarization control beams $I_k$ enter, the relationship between the power of the polarization control beams (i.e., the effective internal intensity) and the formation condition for the spacer layer 30 of the wavelength division demultiplexing device 50 based on the refractive index n of the Kerr medium of the spacer layer 30 for the desirable polarization rotation efficiency and line width can be defined as follows.

$$n = n_0 + n_2 I_p \quad (2)$$

In the above formula, $n_0$ indicates a linear refractive index which is the normal refractive index when the polarization control beams do not enter. The symbol $n_2$ indicates a non-linear refractive index which is the refractive index when the polarization control beams enter. The symbol $I_p$ indicates the power of the polarization control beams (w/cm$^2$).

The non-linear refractive index generally have a value of $10^{-4}$cm$^2$/W.

In this context, the thickness of the spacer layer d in which the initial tuning phase of the spacer layer 30 is $m\pi + 1.4\pi$ is defined as follows.

$$d = \pi(m+1.4)/2n_0 \quad (3)$$

In the above formula, m indicates an integer.

In the preferred embodiment of the present invention, the initial tuning phase indicates the phase when the polarization control beams have a value of 0, that is, the phase when $n=n_0$.

Based on the above formula, it is assumed for the wavelength division demultiplexing device 50 according to the present invention that: the wavelength $\lambda$ of the incident signal beams S is 0.86 μm; the linear refractive index $n_0$ is 3.5; and the integer m is 100. Then the thickness d of the spacer layer becomes 12.2 μm.

Then the power of the polarization control beams $I_k$ which maintain the bistable characteristics can be calculated based on Formula 4 below.

$$I_k = (\pi V \phi i)/(2n_2 d) \quad (4)$$

Based on Formula 4, the effective incident beams (V$\phi i$) for 0.5$\pi$ is equivalent to the power of the polarization control beams of 176.3 W/cm$_2$.

Further, referring to FIG. 2, in connection with the polarizing state of the polarization control beams $I_k$, it is assumed that the horizontal axis is an X axis, and the vertical axis is a Y axis. Then the polarized beams of the signal beams S are separated into an X component and a Y component, thereby recognizing the beams.

The refractive index of the X component of the signal beams is greatly varied owing to the Kerr effect in the spacer layer 30 of the wavelength division demultiplexing device 50, the Kerr effect being generated by the polarization control beams $I_k$, while the refractive index of the Y component is not greatly varied.

Due to the difference between the refractive indices of the X component and the Y component, an optical path difference is produced. Further, due to the optical path difference, the polarizing rotations of the signal beams of the X component and the Y component do not correspond with each other.

By utilizing this feature, only one component among the X component of the polarized beams and the Y component of the polarized beams is rotated by 180 degrees, so that the polarized beams of the signal beams S would be rotated by 90 degrees.

Under this condition, the line width of the polarization-rotated signal beams can be determined by adjusting the reflectivity of the mirror layers.

In this embodiment, it is assumed that the top mirror layer has a reflectivity of 90%, that the bottom mirror layer has a reflectivity of 100%, that the value of the initial tuning phase is set to mπ+1.4π (m being an integer); and that the magnitude of the non-linear refractive index due to the Kerr effect is set to 3:1. Under these assumptions, FIG. 3 illustrates the characteristics of the reflected beams relative to the signal beams which are rotated by 90 degrees owing to the effective internal intensity of the polarization control beams.

Figure 3:
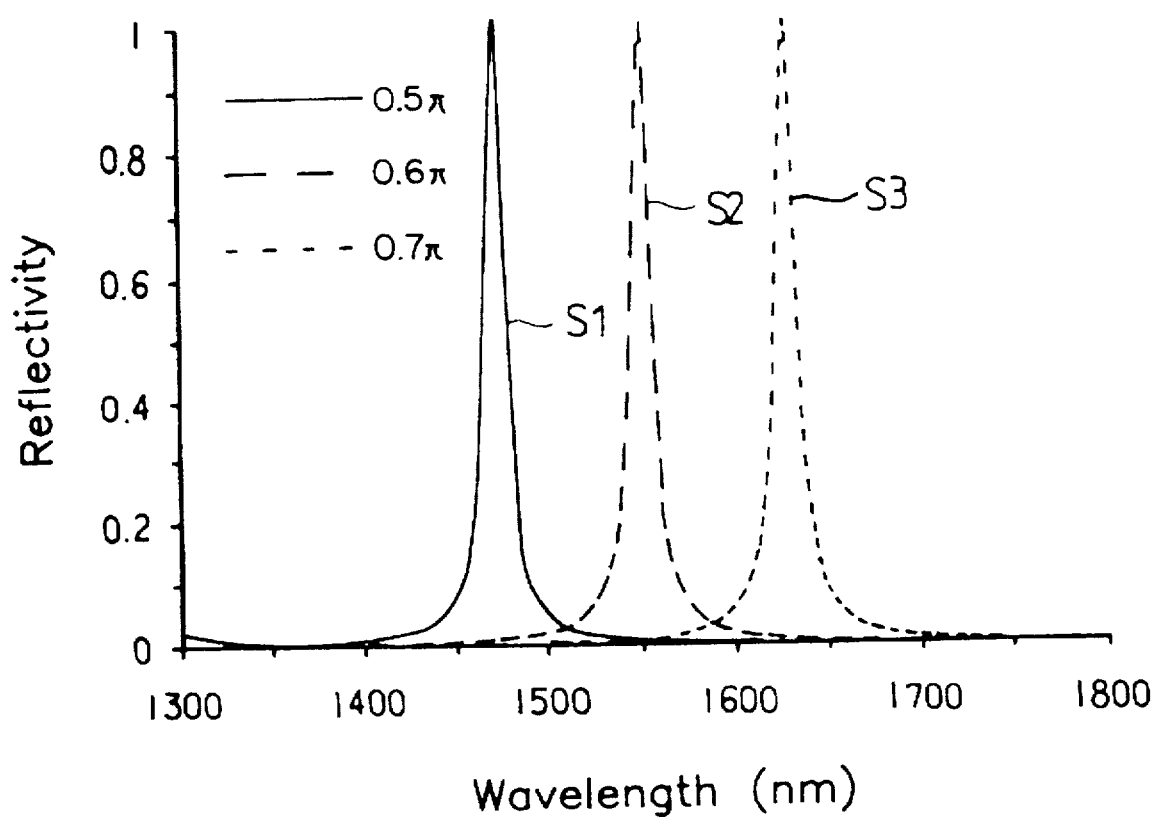
FIG. 3 is a graphical illustration showing the relationship in which the wavelength and the reflectivity of the beams incident to the wavelength division demultiplexing device of FIG. 1 are varied in accordance with the intensity of the polarization control beams.

In the graphical illustration of FIG. 3, the X axis shows the wavelength of the signal beams, while the Y axis shows the reflected beams which are reflected by the wavelength division demultiplexing device.

Further, as shown by S1, S2 and S3 in FIG. 3, the peak of the reflected beams moves in accordance with the effective internal intensity of the polarization control beams, and the polarizing rotation efficiency is maintained almost at 100%, while FWHM is maintained at a line width of 20 nm.

In the above described embodiment, if the reflectivity of the top mirror layer is raised to 95%, then the line width of the peak of the reflectivity can be lowered to about 10 nm.

If these characteristics are utilized, the device of the present invention can be applied to an optical exchange device and an optical logic device.

That is, particular signal beams can be put to on and off in accordance with the intensity of the polarization control beams, and therefore, the device of the present invention can be applied to an optical exchange device.

Further, in FIG. 3, the signals corresponding to the solid line peak and the dotted line peak are indicated by S1 and S2 respectively, and the intensity of the bias beams is set to Pv(0.4π), while two control beams are indicated by P1(0.1π) and P2(0.1π). Then the device of the present invention can serves as an optical logic device such as an exclusive OR gate XOR and an AND gate AND as shown in the following table.

| Logic Table | | | |
|---|---|---|---|
| P1 | P2 | S1 | S2 |
| 0 | 0 | 0 | 0 |
| 0 | 1 | 1 | 0 |
| 1 | 0 | 1 | 0 |
| 1 | 1 | 0 | 1 |
| Logic arithmetic | | XOR | AND |

In the case of reflected beams in which the polarized beams are not rotated, arithmetic is carried out by taking the opposite of the above table.

According to the wavelength division demultiplexing device of the present invention, the reflectivities of the mirror layers can be adjusted in such a manner that the signal beams in which the different wavelengths are multiplexed can be split into particular wavelengths having an FWHM of less than several nm. As to the wavelength of the signal beams, the band width is large so that a large number of channels can be provided in accordance with the intensity of the polarization control beams. Further, a polarizing rotation efficiency close to 100% can be obtained. However, the energy loss of the beams is very small, and, owing to the stacked structure, the wavelength division demultiplexing devices can be arranged in the number of N, with the result that the manufacturing cost is saved.

What is claimed is:

1. A wavelength division demultiplexing device comprising:
   a substrate;
   a first mirror layer formed on the substrate having an alternating repeating stack, in a direction of an incident signal beam having a range of wavelengths, of a lower refractive index medium and a higher refractive index medium functioning as a bottom mirror layer;
   a second mirror layer having an alternating repeating stack, in the direction of the incident beam having the range of wavelengths, of a higher refractive index medium and a lower refractive index medium functioning as a top mirror layer; and
   a spacer layer composed of a Kerr medium and disposed between said first mirror layer and said second mirror layer with the Kerr medium rotating the incident signal beam in response to interference with a polarization control beam; and
   wherein a reflectivity of said first mirror layer is higher than that of said second mirror layer; and
   an optical thickness of said spacer layer is chosen so that a value of an initial tuning phase of said spacer layer for the incident signal beam having the range of wavelengths is mπ+tπ, where m represents an integer, and t varies from 0.2–0.4.

2. The wavelength division demultiplexing device as claimed in claim 1, wherein the reflectivity of said first mirror layer functioning as a bottom mirror layer is set to 100%, and the reflectivity of said second mirror layer functioning as a top mirror layer is set to 95% to 99%.

3. The wavelength division demultiplexing device as claimed in claim 1, wherein the optical thickness of the higher refraction index media of said mirror layers is set to ¼ of a wavelength of incident signal beams incident on the device.

4. The wavelength division demultiplexing device as claimed in claim 1, wherein said Kerr medium is a tertiary non-linear material.

5. The wavelength division demultiplexing device as claimed in claim 4, wherein said tertiary non-linear material is selected from the group consisting of $Y_3Fe_5O_{12}$, GdTbFe, TbFeCo, AgInSbTe, $EuFeO_3$, $GdFeO_3$, $FeF_3$, $FeBO_3$, Co, MnBi, $MgFe_2O_4$, GaAs, InAs, and $As_2S_3$.

6. The wavelength division demultiplexing device as claimed in claim 1, wherein said substrate is selected in accordance with a type of said Kerr medium of said spacer layer, and a material of said substrate is selected form a group consisting of glass, quartz, $SiO_2$, fused silica, and polymers.

7. The wavelength division demultiplexing device as claimed in claim 1 wherein a material used for said top and bottom mirror layers is selected from the group consisting of PbTe/ZnS, ZnS/MgF2, and ZnS/Na3AlF6.

8. A system using a wavelength division demultiplexing device, comprising:
   a beam generating means for generating polarization control beams and multiplexed signal beams having different wavelengths and having an angular difference of 45 degrees between the signal beams and the polarization control beams;
   a beam splitting means for receiving the multiplexed signal beams and the polarization control beams for reflecting the signal beams after the signal beams are polarized, rotated and reflected;
   a wavelength division demultiplexing device for rotating by 90 degrees an X component of polarized beams of the incident signal beams by utilizing an interference of the Kerr effect generated from incident multiplexed signal beams after passing through the beam splitting means with the polarization control beams, and for reflecting the X component beams to said beam splitting means; and a polarizing analyzer for receiving the multiplexed signal beams reflected from said beam splitting means to allow pass-through of only the reflected multiplexed signal beams having a particular wavelength in accordance with an intensity of the polarization control beams.

9. A wavelength division demultiplexing device comprising:

a substrate;

a first mirror layer formed on the substrate functioning as a bottom mirror layer;

a second mirror layer functioning as a top mirror layer; and a spacer layer composed of a Kerr medium and disposed between said first mirror layer and said second mirror layer with the Kerr medium rotating an incident signal beam having a range of wavelengths in response to interference with a polarization control beam; and wherein a reflectivity of said first mirror layer is higher than that of said second mirror layer; and an optical thickness of said spacer layer is chosen so that a value of an initial tuning phase of said spacer layer for the incident signal beam having the range of wavelengths is mπ+tπ, where m represents an integer, and t varies from 0.2–0.4.

10. The wavelength division demultiplexing device as claimed in claim 9, wherein the reflectivity of said first mirror layer functioning as a bottom mirror layer is set to 100%, and the reflectivity of said second mirror layer functioning as a top mirror layer is set to 95% to 99%.

11. The wavelength division demultiplexing device as claimed in claim 9, wherein the optical thickness of the higher refraction index media of said mirror layers is set to ¼ of a wavelength of incident signal beams incident on the device.

12. The wavelength division demultiplexing device as claimed in claim 9, wherein said Kerr medium is a tertiary non-linear material.

13. The wavelength division demultiplexing device as claimed in claim 12, wherein said tertiary non-linear material selected from the group consisting of $Y3Fe5O_{12}$, GdTbFe, TbFeCo, AgInSbTe, $EuFeO_3$, $GdFeO_3$, FeF3, $FeBO_3$, Co, MnBi, $MgFe_2O_4$, GaAs, InAs, and As2S3.

14. The wavelength division demultiplexing device as claimed in claim 9, wherein said substrate is selected in accordance with a type of said Kerr medium of said spacer layer, and a material of said substrate is selected form a group consisting of glass, quartz, $SiO_2$, fused silica, and polymers.

15. The wavelength division demultiplexing device as claimed in claim 9 wherein a material used for said top and bottom mirror layers is selected from the group consisting of PbTe/ZnS, ZnS/MgF2, and ZnS/Na3AlF6.

* * * * *